United States Patent
Zhang et al.

(10) Patent No.: US 11,790,580 B2
(45) Date of Patent: Oct. 17, 2023

(54) METHOD FOR RECONSTRUCTING GEOSTATIONARY OCEAN COLOR SATELLITE DATA BASED ON DATA INTERPOLATING EMPIRICAL ORTHOGONAL FUNCTIONS

(71) Applicant: ZHEJIANG UNIVERSITY, Hangzhou (CN)

(72) Inventors: Feng Zhang, Hangzhou (CN); YiJun Chen, Hangzhou (CN); Renyi Liu, Hangzhou (CN); Weiwen Ye, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 27 days.

(21) Appl. No.: 17/042,214

(22) PCT Filed: Jul. 23, 2019

(86) PCT No.: PCT/CN2019/097374
§ 371 (c)(1),
(2) Date: Sep. 28, 2020

(87) PCT Pub. No.: WO2021/000361
PCT Pub. Date: Jan. 7, 2021

(65) Prior Publication Data
US 2023/0154081 A1 May 18, 2023

(30) Foreign Application Priority Data
Jul. 4, 2019 (CN) .......................... 201910600999.6

(51) Int. Cl.
*G06T 5/00* (2006.01)
*G06T 11/40* (2006.01)

(52) U.S. Cl.
CPC .............. *G06T 11/40* (2013.01); *G06T 5/002* (2013.01)

(58) Field of Classification Search
CPC . G06T 11/40; G06T 5/002; G06T 1/00; G06T 5/00; G06T 5/001; G06T 7/00;
(Continued)

(56) References Cited

U.S. PATENT DOCUMENTS

| 7,379,592 B2 * | 5/2008 | Miller ..................... G01W 1/00 382/254 |
| 9,697,614 B2 | 7/2017 | Mansour et al. |
| 2005/0027475 A1 * | 2/2005 | Desa ....................... G01N 21/55 702/156 |

FOREIGN PATENT DOCUMENTS

| CN | 102798384 A * | 11/2012 | ... G06T 2207/10032 |
| CN | 102798384 A | 11/2012 | |

(Continued)

OTHER PUBLICATIONS

Decision to Grant a Patent (2020-556955); dated Dec. 27, 2017.
International Search Report (PCT/CN2019/097374); dated Apr. 2, 2020.

*Primary Examiner* — Jose L Couso
(74) *Attorney, Agent, or Firm* — W&G Law Group (57) ABSTRACT

The present disclosure discloses a method for reconstructing geostationary ocean color satellite data based on Data INterpolating Empirical Orthogonal Functions. The method includes steps of: 1) for an original ocean color remote sensing area, using concentration detection and edge detection to eliminate abnormal image elements; 2) in the Data INterpolating Empirical Orthogonal Functions, using Laplace smoothing filter to smoothly filter a time covariance matrix; 3) for temporal modes value obtained by the Data INterpolating Empirical Orthogonal Functions, first decomposing it into sub-temporal mode, then adopting empirical (Continued)

modal decomposition, and finally performing interpolation, to obtain an ocean color remote sensing reanalysis data set that maintains its original accuracy and full coverage of time and space. Advantage of the method is that it fully considers high time resolution characteristics of the geostationary ocean color satellite data and considers conditions that there is a continuous high missing rate and complete missing in data missing, and it is suitable for the reconstruction of the geostationary ocean color satellite data, with good accuracy and high interpretation rate. The present disclosure has very important practical application value for the reconstruction of the geostationary ocean color satellite data.

10 Claims, 3 Drawing Sheets

(58) Field of Classification Search
CPC . G06T 2207/10032; G06T 2207/20024; G06T 7/001; G06T 7/215; G06T 11/206; G06T 11/00; G06T 17/00; G06T 2207/10004; G06T 2207/10024; G06T 2207/30181; G06T 3/4046; G06T 9/002; G06T 2207/20081; G06T 2207/20084; G06V 10/462; G06V 10/54; G06V 10/513; G06V 10/62; G06V 10/7715; G06V 20/47; G06V 10/454; G06V 10/82; G06V 30/18057; G06F 18/00; G06F 18/21345; G06F 2216/03; G06F 17/00; G06F 17/16; G06F 17/18; G06F 16/29; G01K 13/026; B64G 1/1021; B64G 1/365; G06N 3/02; G06N 3/08–088; G06N 3/0445; G06N 3/0454; G06N 7/00; G06N 20/00; G06K 7/1482; Y10S 128/925

See application file for complete search history.

(56) References Cited

FOREIGN PATENT DOCUMENTS

| | | | | | |
|---|---|---|---|---|---|
| CN | 103020478 | A | | 4/2013 | |
| CN | 103400022 | A | | 11/2013 | |
| CN | 104217098 | A | | 12/2014 | |
| CN | 104361602 | A | * | 2/2015 | ... G06T 2207/10032 |
| CN | 108981957 | A | | 12/2018 | |
| CN | 110378858 | A | | 10/2019 | |
| JP | 2003296702 | A | | 10/2003 | |
| JP | 2016110653 | A | | 6/2016 | |
| KR | 100654368 | B1 | * | 12/2006 | ............. G06F 17/18 |
| KR | 101291675 | B1 | * | 8/2013 | ............. G06F 17/00 |
| KR | 101381292 | B1 | * | 4/2014 | ............... B64G 1/24 |
| KR | 101381293 | B1 | * | 4/2014 | ............... G06T 7/00 |
| KR | 20150128233 | A | * | 11/2015 | ... G06T 2207/10032 |
| KR | 101717167 | B1 | * | 3/2017 | ... G06T 2207/10032 |
| KR | 101731234 | B1 | * | 5/2017 | ... G06T 2207/10032 |
| KR | K101880616 | B1 | * | 7/2018 | ............... G06T 7/60 |

* cited by examiner

METHOD FOR RECONSTRUCTING GEOSTATIONARY OCEAN COLOR SATELLITE DATA BASED ON DATA INTERPOLATING EMPIRICAL ORTHOGONAL FUNCTIONS

TECHNICAL FIELD

The present disclosure relates to the field of ocean remote sensing and, in particular, to a method for reconstructing geostationary ocean color satellite data based on Data INterpolating Empirical Orthogonal Functions.

BACKGROUND

Ocean remote sensing satellites can carry out large-scale and long-term observations of the global ocean, to provide human beings with a data source that cannot be replaced by other observation methods, for understanding the ocean and knowing the ocean. Emergence of geostationary ocean color satellites provides a new perspective for ocean remote sensing research—monitoring changes of ocean color from time to time. The first geostationary ocean color sensor—GOCI (Geostationary Ocean Color Imager) in the world provides, for the first time, ocean color data having time resolution of up to an hour, making it possible to monitor changes in the ocean environment over time. However, affected by clouds, fog and haze over the ocean, there are many cases of continuous high missing rate or even complete missing of data, which has a serious impact on temporal and spatial continuity of data, such that usability of ocean color products obtained by inversion is greatly reduced, and its due value cannot be fully utilized.

The data missing is a common problem in ocean remote sensing data, and in order to complement missing remote sensing data, a variety of data processing methods have been developed at home and abroad for data reconstruction, such as optimal interpolation method, kriging interpolation method, Data INterpolating Empirical Orthogonal Functions, etc., among which, the Data INterpolating Empirical Orthogonal Functions (DINEOF) is a relatively effective method for reconstructing the ocean remote sensing data and has been used to reconstruct a variety of the ocean remote sensing data, such as ocean surface temperature, chlorophyll a concentration, total suspended matter concentration, ocean surface salinity, etc. Due to its own limitations, the Data INterpolating Empirical Orthogonal Functions has many adaptability problems for reconstructing the geostationary ocean color satellite data. Reconstruction research of Liu Xiaoming and Wang Menghua has a shorter time span than quarters, and it focuses on time sections having relatively low data missing rates in summer and autumn.

SUMMARY

An object of the present disclosure is to overcome the existing shortcomings and provide a method for reconstructing geostationary ocean color satellite data based on the Data INterpolating Empirical Orthogonal Functions.

To achieve the object of the present disclosure, technical solutions provided are as follows.

Provided is a reconstruction method for geostationary ocean color satellite data based on Data INterpolating Empirical Orthogonal Functions, and as the reconstruction method includes steps of:

S1: performing preprocessing for each geostationary ocean color satellite remote sensing image in an original ocean color remote sensing data set to be reconstructed, and setting abnormal image elements as data missing points, and eliminating, from the data set, extremely-high-missing-rate data having a missing rate higher than an upper limit in time or space;

S2: constructing a two-dimensional data matrix based on a time-space field of preprocessed ocean color remote sensing data set, performing reconstruction by the Data INterpolating Empirical Orthogonal Functions, and, before each iteration decomposition, filtering a time covariance matrix using Laplace smoothing filter; and after the reconstruction, obtaining an optimal retained mode number, and corresponding temporal modes and spatial modes;

S3: decomposing the temporal modes into characteristic mode vectors according to columns, each column of the characteristic mode vectors is decomposed into a plurality of sub-temporal mode according to time to which the data belongs, then performing empirical modal decomposition on each of the plurality of sub-temporal mode, using a cubic spline interpolation method to complement data at positions corresponding to the extremely-high-missing-rate data in inherent mode function components and residual after decomposition, and re-superimposing and merging to obtain complete temporal modes having a continuous time series;

S4: using the spatial modes obtained in the step S2 and the complete temporal modes obtained in the step S3, to reconstruct to obtain a geostationary ocean color satellite data set with full coverage in time and space.

Based on the above technical solution, each step is preferably implemented in the following specific ways. The preferred implementation manners of each step can be combined correspondingly without conflict, which does not constitute a limitation.

Preferably, in the step S1, for each geostationary ocean color satellite remote sensing image, the abnormal image elements are identified and processed according to steps of S11 to S15:

S11: for each geostationary ocean color satellite remote sensing image in an original ocean color remote sensing data set to be reconstructed, setting a space window having a side length of L by respectively taking each valued image element in the image as a center;

S12: for each valued image element, calculating concentration $O_{conc}$ of the image element by taking all valued image elements in the space window corresponding to the image element as a sample data set O, and:

$$O_{conc} = \left| \frac{O_i - O_m}{\delta} \right|$$

where $O_i$ is a current image element value of the concentration to be calculated, $O_m$ is the median of the sample data set O; and a standard deviation $\delta$ is: $\delta = k * MAD(O)$, where k is a scale factor constant, and MAD(O) is a median absolute deviation of the sample data set O;

S13: for each valued image element respectively, calculating an edge detection value $O_{prox}$ of the image element, and $O_{prox}$ being a positive value if a valueless image element exists around the image element, or $O_{prox}$ being zero if no valueless image element exists around this image element;

S14: for each valued image element respectively, calculating an anomaly detection result $O_{final}$ of the image element:

$$O_{final} = w_{prox}O_{prox} + w_{conc}O_{conc} \qquad 5$$

where $w_{prox}$ is an edge detection weight, $w_{conc}$ is a concentration detection weight, and it is satisfied that $w_{prox} + w_{conc} = 1$; and S15: according to a preset threshold $O_{threshold}$ of abnormal image element detection, taking the image element having the $O_{final}$ larger than the threshold $O_{threshold}$ as the abnormal image element, and setting the abnormal image element as the data missing point.

Preferably, in the step S1, eliminating the extremely-high-missing-rate data includes:

in terms of time, eliminating an image corresponding to the moment if a missing rate of the geostationary ocean color satellite remote sensing image at any moment is larger than an upper limit of the missing rate; and in terms of space, eliminating the image element values of the position point in all images if a missing rate of the time series data at any position point in all geostationary ocean color satellite remote sensing images is larger than the upper limit of the missing rate.

Further preferably, the upper limit of the missing rate is 95%.

Preferably, the step S2 includes steps of:

S21: setting the time-space field of the preprocessed ocean color remote sensing data set as an m×n two-dimensional data matrix $X^0$, where m is the number of the spatial position points in the geostationary ocean color satellite remote sensing image, n is the total number of moments represented by the images in the ocean color remote sensing data set, and m>n, wherein for the matrix $X^0$, the m rows respectively represent the time series values of m different spatial position points, and the n columns respectively represent the values of all the spatial position points at n different moments;

S22: calculating an average $\overline{X^0}$ of all valid data in the matrix $X^0$, and letting $X = X^0 - \overline{X^0}$; and randomly selecting a part of the valid data from the matrix X as a cross-validation set $X^c$, and setting values of all the missing points of the data in the matrix X and the elements extracted into the cross-validation set $X^c$ to be zero;

S23: iterating on the number P of the retained modes, calculating the spatial modes $U_P$, the temporal modes $V_P$, and a root mean square error R between the reconstructed value and the original value of the cross-validation set under different P values; wherein steps S231 to S234 are executed in each iteration:

S231: performing a singular value decomposition on the matrix X, calculating P largest singular values and singular vectors through eigenvector decomposition, then obtaining an m×P spatial modes $U_P$, P×P singular value matrix $S_P$, and n×P temporal modes $V_P$, and a calculation equation thereof is:

$$X^T X v_i = \rho_i^2 v_i$$

$$u_i = \frac{X v_i}{\rho_i}$$

where $u_i$ is an i-th column o the spatial modes $U_P$, $v_i$ is an i-th column of the temporal modes $V_P$, $\rho_i$ is a singular value corresponding to $u_i$ and $v_i$, i=1, . . . , P; and $X^T X$ is an n×n time covariance matrix;

S232: using the Laplace smoothing filter to first filter columns of the time covariance matrix, and then filter rows of the time covariance matrix; wherein for the rows or columns of the time covariance matrix, each is regarded as a time series data set $C = \{c_1, c_2, \ldots, c_n\}$ including data of n moments, and a time set corresponding to C is $T = \{t_1, t_2, \ldots, t_n\}$ $c_l$ is time series data of a l-th time $t_l$, l=1, 2, . . . , n, and it is satisfied that $t_1 < t_2 < \ldots < t_n$; and a formula for h Laplace smoothing filter is $$c_l^{(s+1)} = c_l^{(s)} + \frac{w_{l+1} - w_l}{t'_{l+1} - t'_l}$$

$$w_l = \alpha \frac{c_l - c_{l-1}}{t_l - t_{l-1}}$$

$$t'_l = t_{l-1} + t_l$$

where, $c_l^{(s)}$ represents data $c_l$ before the Laplace smoothing filter, $c_l^{(s+1)}$ represents data $c_l$ after the Laplace smoothing filter; and a is a smoothing strength, $0 < \alpha < 1$;

S233: after completing the Laplace smoothing filter once, calculating reconstructed values of all data missing points in the matrix X, wherein a reconstructed value $X_{i,j}^{re}$ of a missing point located in the i-th row and j-th column of the matrix X is:

$$X_{i,j}^{re} = (U_P S_P V_P^T)_{i,j} = \sum_{p=1}^{P} \rho_p (u_p)_i (v_p^T)_j$$

where: $(u_p)_i$ is an i-th element in a p-th column of the spatial modes $U_P$, $(v_p^T)_j$ is a j-th element in a p-th column of the temporal modes $V_P$, and $\rho_p$ is a corresponding singular value; and S234: calculating a root mean square error R between the reconstructed value and the true value of all the elements in the cross-validation set:

$$R = \sqrt{\frac{1}{N} \sum_{p=1}^{N} (X_p^{re} - X_p^c)^2}$$

where N is the total number of data in the cross-validation set; $X_p^{re}$ and $X_p^c$ are the reconstructed value and true value of the p-th element in the cross-validation set, respectively;

wherein if the root mean square error R is larger than an error threshold, the reconstructed values of all missing points in the matrix X obtained in the step S233 are updated to the matrix X, then the steps S231 to S233 are repeated for the updated matrix X, until the root mean square error R converges below the threshold, then the repetition stops, and the converged root mean square error R is recorded as the root mean square error $R^P$ under the current retained mode number P; and S24: comparing the root mean square error $R^P$ under different retained mode numbers P=1, 2, . . . , $k_{Max}$, taking the P value corresponding to the smallest $R^P$ as an optimal retained mode number $\overline{P}$, to obtain optimal temporal modes $V_{\overline{P}}$ and optimal spatial modes $U_{\overline{P}}$.

Preferably, in the step S23, an iteration range of the retained mode number P is $[1, k_{MAX}]$, and the maximum number of iterations $k_{MAX} \leq \min(m,n)$.

Further preferably, in the step S23, if the number of repetitions of the steps S231 to S233 for the singular value decomposition and the Laplace smoothing filter reaches the maximum number of times, the repetition stops, and a final root mean square error R is directly recorded as the root mean square error $R^P$ under the current retained mode number P.

Preferably, the step S3 includes steps of:

S31: decomposing each column of characteristic mode vectors in the optimal temporal modes $V_{\overline{P}}$, and when decomposing, decomposing data belonging to a same time in different days into one sub-temporal modes with a daily cycle, and the i-th column characteristic mode vector $v_i(t)$ is decomposed into:

$$v_i(t) = (v_{i1}(d1), v_{i2}(dk), \ldots, v_{iK}(dK))$$

where: K is the total number of daily data frequencies of the geostationary ocean color satellite remote sensing image; $v_{ik}(dk)$ is the sub-temporal modes corresponding to the k-th time in $v_i(t)$, and includes data of the k-th time of all dates in $v_i(t)$; i=1, 2, ..., $\overline{P}$; k=1, 2, ..., K; dk represents the dates included in the data in $v_{ik}(dk)$, and a missing date corresponding to the extremely-high-missing-rate data is not included in dk;

S32: performing empirical decomposition for each sub-temporal modes $v_{ik}(dk)$ in each column of the characteristic mode vectors:

$$v_{ik}(dk) = \sum_{j=1}^{n} c_j(dk) + r_n(dk)$$

where n is the total number of moments represented by the images in the ocean color remote sensing data set, and $c_j(dk)$ is the j-th inherent mode function component, and $r_n(dk)$ is residual of the decomposition;

S33: for each sub-temporal modes $v_{ik}(dk)$, using a cubic spline interpolation method to interpolate and fill all the inherent mode function components $c_j(dk)$ and the data missing date positions in the residual signal $r_n(dk)$, then re-superimposing all the inherent mode function components and residual signals after the interpolation and filling, to obtain the sub-temporal modes $v_{ik}(Dk)$ having a complete time series; wherein Dk includes all consecutive dates having the k-th time;

S34: re-superimposing and merging the K sub-temporal mode $v_{ik}(Dk)$ of a same column of the characteristic mode vectors, to obtain the complete characteristic mode vector $v_i(T)$ including all moments, and T represents a moment corresponding to the extremely-high-missing-rate data; and S35: re-superimposing and merging all $\overline{P}$ columns of the complete characteristic mode vectors $v_i(T)$, to obtain the complete temporal modes $V_T$ having a continuous time series.

Further preferably, the total number K of the daily data frequencies of the geostationary ocean color satellite remote sensing image is 8.

Preferably, the step S4 includes steps of:

S41: using the spatial modes $U_{\overline{P}}$ obtained in the step S2 and the complete temporal modes $V_T$ obtained in the step S3, to recalculate the reconstructed values of all missing points in the matrix X, and the reconstructed value $X_{i,j}^{re}$ of the missing point located in the i-th row and j-th column of the matrix X is:

$$X_{i,j}^{re} = \left(U_{\overline{P}} S_{\overline{P}} V_T^T\right)_{i,j} = \sum_{p=1}^{\overline{P}} \overline{\rho}_p (\overline{u}_p)_i (\overline{v}_p^T)_j$$

where $(\overline{u}_p)_i$ is the i-th element in the p-th column of the spatial modes $U_{\overline{P}}$, $(\overline{v}_p^T)_j$ is the j-th element in the p-th column of the temporal modes $V_T$, $\overline{\rho}_p$ is a corresponding singular value; and S42: updating the reconstructed values of all missing points in the matrix X obtained in the step S41 to the matrix X, and keeping values of other elements of the matrix X unchanged, to obtain the time-space field of the ocean color remote sensing data set with the missing values being complemented, so as to obtain a geostationary ocean color satellite data set fully covering time and space.

Compared with the related art, the present disclosure has beneficial effects.

In view of the limitations of the DINEOF method, the present disclosure fully considers its characteristics of high time resolution and considers conditions that there is a continuous high missing rate and complete missing in data missing, first uses the concentration detection and the edge detection to check the abnormal image elements in the remote sensing data, to avoid interference of outliers on cross-validation in the DINEOF method, then introduces the Laplace smoothing filter to filter the time covariance matrix in the DINEOF decomposition, to reduce data fault caused by night intervals and continuous data missing, then performs second decomposition on the temporal modes obtained by reconstruction and then interpolates, to realize the reconstruction of high missing rate data and continuous missing data, so as to finally obtain an ocean color remote sensing reanalysis data set that maintains its original accuracy and full coverage of time and space. The present disclosure improves the number of the retained modes (Mode), reconstruction accuracy (MSE, RMSE, MAE), signal interpretation rate and reconstruction rate, and the operation is simple and easy, and the reconstruction result is intuitive. The present disclosure provides demonstration and reference for reconstruction of other remote sensing data with high time resolution characteristics or ocean color satellite data with large time interval changes.

DESCRIPTION OF EMBODIMENTS

The present disclosure will be further elaborated and illustrated below in conjunction with the accompany drawings and specific embodiments.

Figure 1:
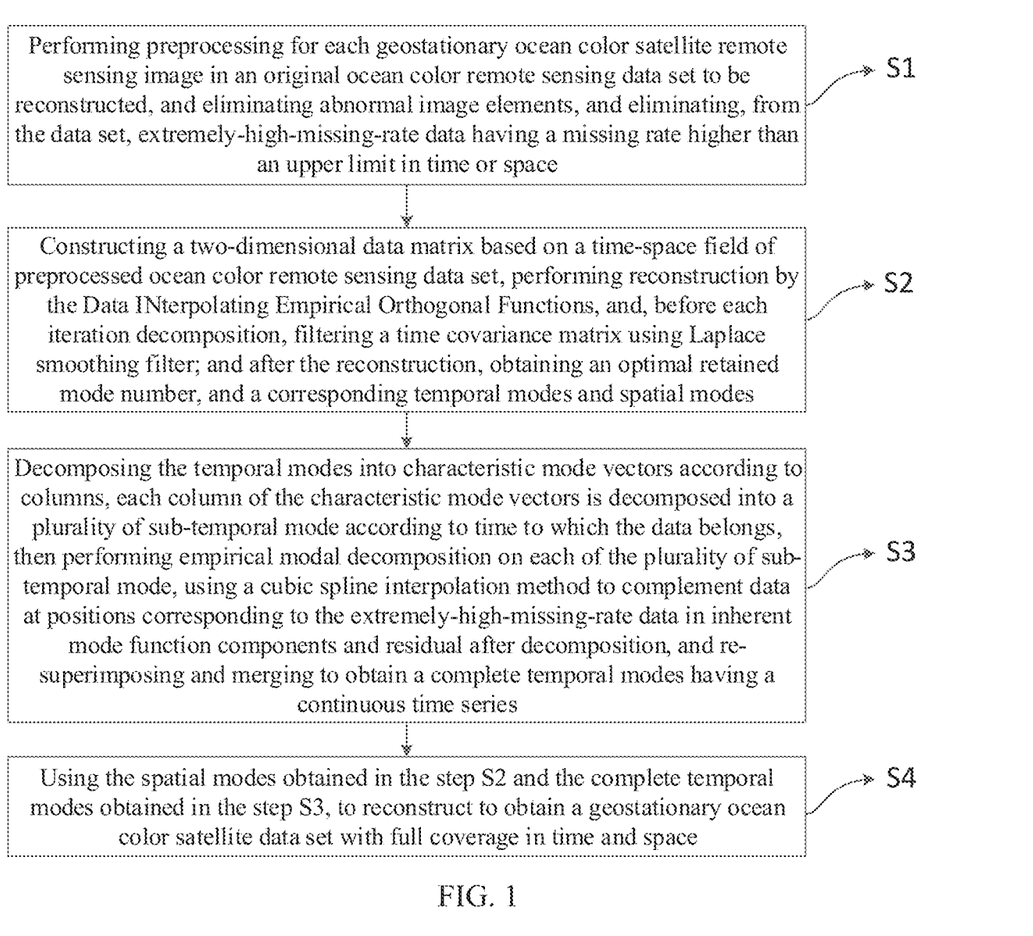
FIG. 1 is a flow chart of a method for reconstructing geostationary ocean color satellite data based on Data INterpolating Empirical Orthogonal Functions.

As shown in FIG. 1, it is a flowchart of a method for reconstructing geostationary ocean color satellite data based on the Data INterpolating Empirical Orthogonal Functions provided in a preferred embodiment of the present disclosure. Main steps thereof include 4 steps, which are S1 to S4, respectively:

S1: performing preprocessing for each geostationary ocean color satellite remote sensing image (GOCI image) in an original ocean color remote sensing data set to be reconstructed, to identify abnormal image elements, and setting the abnormal image elements as data missing points, and eliminating, from the data set, extremely-high-missing-rate data having a missing rate higher than an upper limit in time or space.

S2: constructing a two-dimensional data matrix based on a time-space field of preprocessed ocean color remote sensing data set, performing reconstruction by the Data INterpolating Empirical Orthogonal Functions, and, before each iteration decomposition, using Laplace smoothing filter to filter a time covariance matrix; after the reconstruction, obtaining an optimal retained mode number, and corresponding temporal modes and spatial modes.

S3: decomposing the temporal modes obtained in S2 into characteristic mode vectors according to columns, each column of the characteristic mode vectors is decomposed into a plurality of sub-temporal mode according to time to which the data belongs, then performing empirical modal decomposition on each of the sub-temporal modes, using a cubic spline interpolation method to complement the data at positions corresponding to the extremely-high-missing-rate data in the inherent mode function components and the residual after decomposition, re-superimposing and merging to obtain complete temporal modes having a continuous time series.

S4: using the spatial modes obtained in S2 and the complete temporal modes obtained in S3, to reconstruct to obtain the geostationary ocean color satellite data set with full coverage in time and space.

The specific implementation manners and effects of the S1 to S4 in this embodiment will be described in detail below.

First of all, although the GOCI data has undergone data quality control, there may still be outliers within a reasonable range. Therefore, one of purposes of the step S1 is to process these abnormal image elements, to prevent noise from being introduced during the reconstruction. The most common method of concentration detection is to judge whether data is "outlier" based on an average and a standard deviation of all the data. This method is relatively simple to calculate, but if there are a large number of outliers in the data set to be detected, it will greatly affect description of overall characteristics of the data by the average and the standard deviation, thereby resulting in greater uncertainty in outlier detection. In order to avoid the above situation, using a median and a median absolute deviation (MAD) to replace the average and the standard deviation is a more robust detection method.

In this embodiment, for each geostationary ocean color satellite remote sensing image, in the preprocessing process, weighted results of the concentration detection and edge detection are used as a standard, and the abnormal image elements are identified and processed according to S11 to S15:

S11: for each geostationary ocean color satellite remote sensing image in the original ocean color remote sensing data set to be reconstructed, setting a space window having a side length of L by respectively taking each valued image element in the image as a center, and L can be adjusted according to actual situations.

S12: for each valued image element, taking all the valued image elements in the space window corresponding to this image element as a sample data set O, and calculating concentration $O_{conc}$ of the image element:

$$O_{conc} = \left| \frac{O_i - O_m}{\delta} \right|$$

where $O_i$ is a current image element value of the concentration to be calculated, $O_m$ is the median of the sample data set O; a standard deviation $\delta$ is: $\delta=k*MAD(O)$, k is a scale factor constant, and MAD(O) is a median absolute deviation of the sample data set O.

For normally distributed data, it is assumed that a normal value falls in a middle 50% area, then the outliers fall in a 50% area on both sides, and it can be obtained by converting that k=1.4826. According to the $3\sigma$ standard, image elements with $O_{conc}$ larger than 3 can be regarded as abnormal image elements.

S13: to enhance the stability of monitoring of the abnormal image elements, the present disclosure uses a simple edge detection method to mark image elements at an edge of a cloud, based on causes of the abnormal image elements, that is, the probability of the abnormal image elements occurring at the edge of the cloud is higher: for each valued image element respectively, calculating an edge detection value $O_{prox}$ of the image element, and if there are valueless image elements in 8 image elements around this image element, then $O_{prox}$ takes a positive value M, and if there are no valueless image elements in the 8 image elements around this image element, then $O_{prox}$ will take zero. In this embodiment, in order to keep consistent in value with the result of the concentration detection, if there are valueless image elements around the image element, then it is marked that M=3, and if no, then it is marked as 0, that is:

$$O_{prox} = \begin{cases} 3, & \text{there are valueless image elements around} \\ 0, & \text{There is no valueless image elements around} \end{cases}$$

S14: for each valued image element respectively, calculating an anomaly detection result $O_{final}$ of the image element:

$$O_{final} = w_{prox} O_{prox} + w_{conc} O_{conc}$$

where $w_{prox}$ is edge detection weight, $w_{conc}$ is concentration detection weight, and it is satisfied that $w_{prox}+w_{conc}=1$. $w_{prox}$ and $w_{conc}$ can be adjusted according to actual conditions.

Using the weighted result to detect abnormal image elements, on the one hand, improves the stability of the detection, to avoid excessive punishment by a single method, which leads to more data missing and loss of the original change characteristics of the data, and on the other hand, it is also possible to adjust the weight according to sources and characteristics of the abnormal image elements in given original data, to improve the effect of the outlier detection.

S15: according to a preset threshold $O_{threshold}$ of the abnormal image element detection, taking image elements having the $O_{final}$ larger than the threshold $O_{threshold}$ as the abnormal image elements, and setting the abnormal image elements as the data missing points. A magnitude of the threshold $O_{threshold}$ determines the number of abnormal image elements that are eliminated, and in this embodiment, the detection threshold $O_{threshold}$ is set to 3.

In addition, if the original data has a high missing rate in the time or space dimension (usually more than 95%), then these data not only cannot provide effective information, but may affect a final result. Therefore, the Data INterpolating Empirical Orthogonal Functions (hereinafter referred to as DINEOF) cannot reconstruct these extremely-high-missing-rate data and needs to eliminate before the reconstruction, otherwise, the reconstruction result of the image having a high missing rate is replaced by the average of the original remote sensing data set.

In this embodiment, a method for eliminating the extremely-high-missing-rate data is: in terms of time, if the missing rate of the geostationary ocean color satellite remote sensing image at any moment is larger than an upper limit of the missing rate, then an image corresponding to that moment will be eliminated; in terms of space, if a missing rate of the time series data at any position point in all geostationary ocean color satellite remote sensing images is larger than the upper limit of the missing rate, then the image element values of the position point in all images will be eliminated, and the eliminated image element is not regarded as the data missing point. The upper limit of the missing rate can generally be set to 95%.

The original data reconstructed by the DINEOF method should remain continuous in time, and time intervals of the data are the same. For the geostationary ocean color satellite data, the data itself is continuous within the same day and the time intervals are consistent, while after high-frequency daytime data, there is a nighttime gap with no data for a long time, and the nighttime gap usually exceeds 12 hours and is longer in winter. On the other hand, since cover time of the cloud is usually longer than a monitoring period of the geostationary ocean color satellite, there are many cases where the data has a continuous high missing rate or even complete missing in local data, which further reduces the continuity of the data. In data having poor continuity, there will be some characteristics having abnormal changes in the data, but these characteristics do not represent an entire spatial-temporal variability of the data, resulting in that the DINEOF method overfits a small amount of the original data and the abnormal changes, so that the reconstructed image does not necessarily reflect due spatial and temporal changes of the given image and causes the reconstruction data to have obvious faults, and there are very unreasonable continuous time images occurring. The present disclosure considers a filter to smooth the original remote sensing data, and this filter, unlike general smoothing methods (such as a median filter, a mean filter, etc.), needs to retain original change characteristics of the data while eliminating mutations and noise. In this regard, the present disclosure introduces the Laplace smoothing method to construct a filter suitable for smoothing the time series data and apply it to the reconstruction process of DINEOF. The following first introduces a theory of a filtering process.

The Laplace filter is applied to m time series of a data matrix X (m×n), and it can be understood as extending the Laplace smoothing filter (n×1) acting on one-dimensional time series to two-dimensional, a constructed Laplace filter L is an n×n matrix, and the matrix X is filtered in a time domain:

$$\tilde{X} = XL$$

where, $\tilde{X}$ is an original matrix after the Laplace smoothing filter. Theoretically, this filter can directly filter X, but processing and computation of the original matrix is too large, requiring calculations of m times. Considering that in singular value decomposition (SVD) calculations of $\tilde{X}$, only the first few temporal modes and spatial modes are necessary, and P largest singular values and singular vectors are calculated by characteristics vector decomposition, with an equation being:

$$\tilde{X}^T \tilde{X} v_i = \rho_i^2 v_i$$

where, $v_i$ is the i-th column of the temporal modes V, $\rho_i$ is the corresponding singular value, and i=1, . . . , P. Since $\tilde{X}^T \tilde{X}$ is an n×n matrix, it is defined as a time covariance matrix A. The filter L can be combined with the SVD decomposition of $\tilde{X}$, to change filtering of the original matrix to filtering of the time covariance matrix. An eigenvector decomposition expression is performed on the matrix $\tilde{X}$ filtered by the Laplace smoothing filter, and it can be seen that the time covariance matrix after the Laplace smoothing filter is:

$$\tilde{A} = L^T A L$$

According to the above formula, the Laplace filter L filters columns of the time covariance matrix A first, and then filters rows of the time covariance matrix A. Thus, while greatly reducing the computation (from m times to 2n times), sensitivity to the missing data is also reduced (there are no missing values in the time covariance matrix). Optimal α and P values can be determined through a root mean square error of the DINEOF decomposition. Generally, the value of α is kept constant and the value of P is optimized.

Based on the foregoing theory, the reconstruction process by the Data INterpolating Empirical Orthogonal Functions in this embodiment is mainly implemented through the step S2, and a specific method thereof is described in detail below:

S21: setting the time-space field of the preprocessed ocean color remote sensing data set as an m×n two-dimensional data matrix $X^0$, where m is the number of the spatial position points in the geostationary ocean color satellite remote sensing image, it is the total number of moments represented by the images in the ocean color remote sensing data set, and m>n, each row of the matrix $X^0$ respectively represents a time series composed of pixel values of one spatial position point at different moments, and each column respectively represents values of all spatial position points at a moment, that is, the pixel values on a GOCI image at a certain moment. Therefore, the m rows of the matrix $X^0$ respectively represent the time series values of the m different spatial position points, and the it columns respectively represent the values of all the spatial position points at n different moments. I is denoted as a set of the missing data points (including the original missing ones and the abnormal image elements identified in the S1), the missing values in the matrix are represented by NaN, and P is denoted as the number of retained modes, P≤min(m,n).

S22: calculating an average $\overline{X^0}$ of all valid data in the matrix $X^0$, and letting $X = X^0 - \overline{X^0}$, which means subtracting the average $\overline{X^0}$ from the values of all valued elements in $X^0$; a part of the valid data is randomly selected from the matrix X as a cross-validation set $X^c$, which is generally 1% of the total amount of the valid data, as a criterion for judging the optimal number of the retained modalities. A point in X at the same position in the cross-validation set is also regarded as a missing point, and a value assigned thereto is NaN. A value of 0 is assigned to all the missing points of the data in the matrix X and the elements extracted into the cross-validation set $X^c$, that is, to replace all the points in X having the value of NaN with 0.

S23: iterating on the number P of the retained modes, calculating the spatial modes $U_P$, the temporal modes $V_P$, and the root mean square error R between the reconstructed value and the original value of the cross-validation set under different P values. P is a positive natural number, and within a value range of $[1,k_{MAX}]$, initializing P=1 before starting iteration, and then P=P+1 after each iteration, and the maximum number of the iterations $k_{MAX} \leq \min(m,n)$.

Steps S231 to S234 are executed in each iteration:

S231: performing the singular value decomposition on the matrix X, calculating the P largest singular values and the singular vectors through the eigenvector decomposition, then obtaining the m×P spatial modes $U_P$, P×P singular value matrix $S_p$, and n×P temporal modes $V_P$, and a calculation equation is:

$$X^T X v_i = \rho_i^2 v_i$$

$$u_i = \frac{X v_i}{\rho_i}$$

where $u_i$ is the i-th column of the spatial modes $U_P$, $v_i$ is the i-th column of the temporal modes $V_P$, $\rho_i$ is the singular value corresponding to $u_i$ and $v_i$, i=1, ..., P; $X^T X$ is the n×n time covariance matrix; a superscript T represents transpose (the same below).

Thus, the spatial modes $U_P$, the temporal modes $V_P$, and the singular value matrix $S_p$ under the current retained mode number P can be obtained for subsequent call.

S232: using the Laplace smoothing filter to filter the columns of the time covariance matrix first, and then filter the rows of the time covariance matrix. When filtering the rows or columns of the time covariance matrix, each of them is regarded as a time series data set $C=\{c_1, c_2, \ldots, c_n\}$ containing data of n moments, and the time set corresponding to C is $T=\{t_1, t_2, \ldots, t_n\}$, $c_l$ is time series data of the l-th time $t_1$, l=1, 2, ..., n, and it is satisfied that $t_1 < t_2 < \ldots < t_n$. A formula for the Laplace smoothing filter is:

$$c_l^{(s+1)} = c_l^{(s)} + \frac{w_{l+1} - w_l}{t'_{l+1} - t'_l}$$

$$w_l = \alpha \frac{c_l - c_{l-1}}{t_l - t_{l-1}}$$

$$t'_l = t_{l-1} + t_l$$

where $c_l^{(s)}$ represents data $c_l$ before the Laplace smoothing filter, and $c_l^{(s+1)}$ represents data $c_l$ after the Laplace smoothing filter; $\alpha$ is smoothing strength, $0 < \alpha < 1$. A superscript s represents the s-th Laplace smoothing filter, and the number s of the Laplace smoothing filter is 1, 2, ... $s_{max}$. An initial value of s is 1, and s=s+1 after performing the filtering once.

The smoothing effect of the filtering depends on the values of $\alpha$ and the maximum number of iterations $s_{max}$. This filtering realizes the smoothing of the time series data while retaining the change characteristics of the time series, and it considers an influence of time relativity.

S233: after completing the Laplace smoothing filter once, calculating reconstructed values of all the data missing points in the matrix X. If an element in the i-th row and j-th column of the matrix X in the matrix X is a missing point, then the reconstructed value $X_{i,j}^{re}$ of the missing point is:

$$X_{i,j}^{re} = (U_P S_P V_P^T)_{i,j} = \sum_{p=1}^{P} \rho_p (u_p)_i (v_p^T)_j$$

where: i and j are space and time subscripts of X, $(u_p)_i$ is the i-th element in the p-th column of the spatial modes $U_P$, $(v_p^T)_j$ is the j-th element in the p-th column of the temporal modes $V_P$, and $\rho_p$ is the corresponding singular value.

Thus, the reconstructed values of all data missing points in the matrix X can be obtained, and since a part of the data is taken from the matrix X in the previous step as the cross-validation set, the error can be calculated after filtering based on a true value of the cross-validation set and a predicted reconstructed value.

S234: calculating the root mean square error R between the reconstructed value and the true value of all the elements in the cross-validation set:

$$R = \sqrt{\frac{1}{N} \sum_{p=1}^{N} (X_p^{re} - X_p^c)^2}$$

where N is the total number of data in the cross-validation set; $X_p^{re}$ and $X_p^c$ are the reconstructed value and true value of the p-th element in the cross-validation set, respectively;

if the root mean square error R is larger than an error threshold, the reconstructed values of all the missing points in the matrix X obtained in S233 are updated to the matrix X, and in this update process, only the data missing points are updated, and other positions remain unchanged. Therefore, the updated matrix $X^{re}$ can be expressed as:

$$X^{re} = X + \partial X$$

where $\partial X$ is a matrix composed of the reconstructed values of the missing points.

Then the updated $X^{re}$ is used as the matrix X again, and repeating the steps S231 to S233. The root mean square error R needs to be calculated for every repetition, until the root mean square error R converges below the threshold, then the repetition stops, and the converged root mean square error R is recorded as the root mean square error $R^P$ under the current retained mode number P. However, considering a calculation efficiency, it is necessary to set an upper limit of the number of repetitions, that is, the aforementioned $s_{max}$. If the number of repetitions of the steps S231 to S233 for the singular value decomposition and the Laplace smoothing filter reaches the maximum number of times $s_{max}$, the repetition will not continue, and a final root mean square error R is directly recorded as the root mean square error $R^P$ under the current retained mode number P.

S24: in the execution of the step S23, the iteration range of the retained mode number P is $[1,k_{MAX}]$, the root mean square error $R^P$ under different retained mode numbers P=1, 2, ..., $k_{MAX}$ can be obtained, and $R^P$ are compared, the P value corresponding to the smallest $R^P$ is taken as the optimal retained mode number $\overline{P}$, to obtain the optimal temporal modes $V_{\overline{P}}$ and the optimal spatial modes $U_{\overline{P}}$. If P=a, then the root mean square error R is the smallest, so the optimal retained mode number is $\overline{P}=a$.

After the above S2 step, the optimal retained mode number $\overline{P}$ can be finally determined, and the optimal singular value matrix $S_{\overline{P}}$, the temporal modes $V_{\overline{P}}$ and the optimal spatial modes $U_{\overline{P}}$ can be obtained. As mentioned above, DINEOF relies on statistical information of the original data to reconstruct, and it cannot reconstruct accurately the data having a very high missing rate larger than 95%, so it needs to be eliminated before reconstruction, and this part of eliminated data does not participate in the Laplace filtering process of step S2 and needs to rely on step S3 to perform interpolation and reconstruction.

The temporal modes reconstructed using the DINEOF method itself reflects the change characteristics of the time series of the data set, and the data of adjacent times have correlation and continuity in temporal modes values corresponding to the same mode, thus it is a feasible method to interpolate the temporal modes to obtain the temporal modes vector corresponding to times having extremely high missing rates. But for geostationary ocean color satellite data, this method has certain shortcomings and cannot be directly used to reconstruct data of times having extremely high missing rates. A main reason is that, for the temporal modes obtained from the reconstruction of the geostationary ocean color satellite data, continuity on a time resolution scale is limited to the day. That is to say, using the adjacent data on different days to interpolate needs to make the temporal modes correspond with the time resolution, to perform non-equidistant interpolation, and for characteristic mode data with periodicity, an effect of interpolation using traditional methods is poor. On the other hand, if it is covered by clouds and fog on the current day, the data at all times during the day will be completely continuously missing data. In this case, using adjacent values to interpolate at intervals of time, it is difficult to match an interpolation result with actual situations. In response to these problems, the present disclosure adopts a method of reducing the time resolution, uses a characteristic that high-time-resolution remote sensing data still has good periodic characteristics at low time-resolution, to propose to first decompose, at a lower time resolution, the temporal modes obtained by reconstruction, construct multiple sub-temporal mode having relatively high continuity and consistent time intervals, then use the empirical modal decomposition method to decompose the sub-temporal mode, use the cubic spline interpolation to fill in missing signals in decomposition results, finally merge them into sub-temporal mode with continuous time and consistent intervals, so as to obtain new temporal modes that includes all times, and this method decomposes the temporal modes twice and then interpolates, so the present disclosure calls it "time mode quadratic decomposition interpolation". A core of this method, on the one hand, is to use a fact that the data acquisition time of the geostationary ocean color satellite data is at equal time intervals at low time resolution, that is, data acquired at the same time for multiple consecutive days have the same time interval (24 hours), and the data has periodicity. On the other hand, the inherent mode function components obtained through empirical modal decomposition are chosen for interpolation, instead of directly interpolating the sub-temporal modes vector, and this is because volatility of the decomposed signal is lower than that of the original signal, making it good for interpolation and filling, and the inherent mode function component contains more details that the original vector does not have, and higher accuracy can be achieved.

In the present disclosure, for the convenience of presentation, data obtained at the same time on different dates (for example, 8 o'clock in the morning on different dates) are referred to as data at the same time. The data interval of the same time on two adjacent days is a fixed 24 h.

In this embodiment, a specific method for performing the "time mode quadratic decomposition interpolation" in step S3 is as follows:

S31: decomposing each column of characteristic mode vectors in the optimal temporal modes $V_{\bar{P}}$, and when decomposing, decomposing data belonging to the same time in different days into one sub-temporal modes with a daily cycle, the i-th column characteristic mode vector $v_i(t)$ is decomposed into:

$$v_i(t) = \{v_{i1}(d1), v_{i2}(dk), \ldots, v_{iK}(dK)\}$$

where: $i=1, 2, \ldots, \bar{P}$; $k=1, 2, \ldots, K$. K is the total number of daily data frequencies of the geostationary ocean color satellite remote sensing image, the GOCI data used in the present disclosure scans the area 8 times a day from 8:30 to 15:30 Beijing time, to obtain 8 images with a time interval of 1 hour, so the value of K is 8. $v_{ik}(dk)$ is the sub-temporal modes corresponding to the k-th time in $v_i(t)$, and it contains data of the k-th time of all dates in $v_i(t)$; dk represents the dates included in the data in $v_{ik}(dk)$, and because the extremely-high-missing-rate data in the data is eliminated, in the decomposed sub-temporal modes, dates corresponding to these data are missing, so it is denoted by dk, that is, missing date corresponding to the extremely-high-missing-rate data is not included in dk, and t in $v_i(t)$ is also used to indicate data missing. Following steps will perform interpolation completion on the data at these missing date positions.

S32: performing empirical decomposition for each sub-temporal modes $v_{ik}(dk)$ in each column of the characteristic mode vectors:

$$v_{ik}(dk) = \sum_{j=1}^{n} c_j(dk) + r_n(dk)$$

where n is the total number of moments represented by the images in the ocean color remote sensing data set, $c_j(dk)$ is the j-th inherent mode function component, and $r_n(dk)$ is residual of the decomposition;

S33: for each sub-temporal modes $v_{ik}(dk)$, using the cubic spline interpolation method to interpolate and fill all the inherent mode function components $c_j(dk)$ and the data missing date positions in the residual signal $r_n(dk)$, then using the previous empirical decomposition formula in a reverse direction, to re-superimpose all the inherent mode function components and residual signals after the interpolation and filling, to obtain the sub-temporal modes $v_{ik}(Dk)$ having the complete time series, and at this time, the data missing date position in the sub-temporal modes has been interpolated to fill the corresponding data, so it is represented by Dk, That is, Dk contains all consecutive dates of the k-th time.

S34: re-superimposing and merging the K sub-temporal mode $v_{ik}(Dk)$ of the same column of the characteristic mode vectors, to obtain the complete characteristic mode vector $v_i(T)$ including all moments, and T represents a moment corresponding to the extremely-high-missing-rate data;

S35: sequentially re-superimposing and merging all $\bar{P}$ columns of the complete characteristic mode vectors $v_i(T)$ into a matrix form again, to obtain the complete temporal modes $V_T$ having a continuous time series.

Therefore, after the aforementioned S1 to S3, the complete spatial modes and the complete temporal modes have been obtained, that is, it is possible to use the DINEOF method to reconstruct a geostationary ocean color satellite data set with full coverage in time and space. A specific reconstruction method of step S4 will be briefly described below:

S41: using the spatial modes $U_{\bar{P}}$ obtained in S2 and the complete temporal modes $V_T$ obtained in S3, to recalculate the reconstructed values of all missing points in the matrix X, and the reconstructed value $X_{i,j}^{re}$ of the missing point located in the i-th row and j-th column of the matrix X is:

$$X_{i,j}^{re} = (U_{\overline{P}} S_{\overline{P}} V_{\overline{T}}^T)_{i,j} = \sum_{p=1}^{\overline{P}} \overline{p}_p (\overline{u}_p)_i (\overline{v}_p^T)_j$$

where the superscript T all means transposition, which is different from "the moment T corresponding to the data having the extremely high missing rate"; $(\overline{u}_p)_i$ is the i-th element in the p-th column of the spatial modes $U_{\overline{P}}$, $(\overline{v}_p^T)_j$ is the j-th element in the p-th column of the temporal modes $V_{\overline{T}}$, $\overline{p}_p$ is the singular value corresponding to $(\overline{u}_P)_i$ and $(\overline{v}_p^T)_j$;

S42: updating the reconstructed values of all missing points in the matrix X obtained in S41 to the matrix X, and in this update process, only the data missing points are updated, while the other positions of the matrix X remain unchanged, and a resulting updated matrix is the time-space field of the ocean color remote sensing data set with the missing values being complemented. Through the updated matrix, it can be re-decomposed and restored, to obtain a geostationary ocean color satellite data set fully covering time and space, and all the geostationary ocean color satellite remote sensing images in the data set are continuous and complete in time and space.

Hereinafter, based on the above-mentioned embodiment method, it is applied to a specific example to demonstrate its effect. The specific process is as described above and will not be repeated. The following mainly shows its specific parameter settings and implementation effects.

Application Example

Taking GOCI total suspended matter concentration data of Hangzhou Bay in 2017 as an example, the present disclosure will be described in detail, and specific steps are as follows:

1) using GOCI Level-1B data provided by the Korea Ocean Satellite Center to perform atmospheric correction using an ultraviolet atmospheric correction method (UV-AC), inverting the total suspended matter concentration data using the empirical modal. The GOCI data was inverted through a TSM inversion modal, and 2,920 pieces of inversion result products (GOCI TSM) of the total suspended matter (TSM) of Hangzhou Bay in 2017 were obtained. A coverage range of each pieces of the GOCI TSM data products is 120.55° E to 122.35° E, 29.85° N to 30.95° N, and an image element size is 0.005°×0.005°. An overall missing rate of the 2920 pieces of the GOCI TSM data is 63.5%, and in terms of space, a missing rate (missing times) of the time series data of effective position points in a study area is 99.93% for the highest (2918 pieces), and 53.94% for the lowest (1575 pieces). In terms of time, a space missing rate in the 2920 pieces of the GOCI TSM data is 1000% for the highest and 0.89% for the lowest, and there are 1124 pieces of data having a missing rate larger than 95%, accounting for 38.49%.

2) According to the aforementioned step S1, for the 2920 pieces of the GOCI total suspended matter concentration data in 2017, setting L=9, that is, a 9×9 space window is used for concentration detection, the concentration detection weight $w_{conc}$ and the edge detection weight $w_{prox}$ are both ½, the detection threshold $O_{threshold}$ is set to 3, and the original data in the abnormal image elements, which serve as the data missing points, is removed. Because of the limitation of DINEOF on the missing rate of original data, original data corresponding to times when the image missing rate is larger than 95% and all pixels corresponding to position points where the time series missing rate is larger than 95% are further eliminated. The data elimination operation reduces the number of available GOCI TSM data from 2920 to 1794, a reduction of 38.56%. Ocean pixels decreased from 39274 to 37152, a reduction of 5.4%, and the pixels that are mainly eliminated are mainly concentrated in nearshore waters. An overall missing rate of reconstructed data after elimination is 38.18%. A calculation basis in DINEOF is based on the mean and covariance of the original data, the TSM data does not show Gaussian distribution, and conversion of the original data needs to be performed before DINEOF. Therefore, the present disclosure performs logarithmic processing with a base of 10 on the original data.

3) Constructing a two-dimensional data matrix on the time-space field of the preprocessed ocean color remote sensing data set according to the aforementioned S2 step, performing reconstruction by the Data INterpolating Empirical Orthogonal Functions, and using Laplace smoothing filter to filter the time covariance matrix before each iteration decomposition; after the reconstruction, obtaining the optimal retained mode number and the corresponding temporal modes and spatial modes. In this embodiment, a is set to 0.01, while $s_{max}$ is set to 30. Finally, when P=169, the root mean square error R is the smallest, so the optimal retained mode number $\overline{P}$=169, and the singular value matrix $S_{\overline{P}}$, the temporal modes $V_{\overline{P}}$ and the optimal spatial modes $U_{\overline{P}}$.

4) Decomposing the temporal modes $V_{\overline{P}}$ into characteristic mode vectors in columns according to the step S3, decomposing each column of the characteristic mode vectors into 8 sub-temporal mode according to the time to which the data belongs, then performing empirical modal decomposition on each of the sub-temporal mode, using the cubic spline interpolation method to complement the data at positions corresponding to the extremely-high-missing-rate data in the inherent mode function components and the residual after decomposition, and re-superimposing and merging to obtain the complete temporal modes having a continuous time series;

5) according to the step S4, using the spatial modes obtained in S2 and the complete temporal modes obtained in S3, to reconstruct the geostationary ocean color satellite data set with full coverage in time and space.

The reconstruction method of the present disclosure is named DINEOF-G, and compared with the original classic DINEOF method (ALVERA-AZCÁRATE A, BARTH A, RIXEN M, et at. Reconstruction of incomplete oceanographic data sets using empirical orthogonal functions: application to the Adriatic Sea surface temperature[J]. Ocean Modelling. 2005, 9(4): 325-346.), the retained mode number (Mode), reconstruction accuracy (MSE, RMSE, MAE), a signal interpretation rate and a reconstruction rate have been improved, as shown in Table 1 below. The reconstruction accuracy has been increased by 8% (calculated by MSE), and the data reconstruction rate has been increased from 58% to 94%, an increase of 36%.

TABLE 1

| Reconstruction method | Mode | MSE | RMSE | MAE | Interpretation rate | Reconstruction rate |
|---|---|---|---|---|---|---|
| Classic DINEOF method | 140 | 0.0212 | 0.1457 | 0.1044 | 95.01% | 58.24% |
| The present disclosure | 169 | 0.0195 | 0.1395 | 0.0998 | 96.82% | 94.6% |

In order to further analyze the effect of each step in the DINEOF-G method proposed by the present disclosure and its influence on the reconstruction result, a manner of adjusting the steps and experimental parameters is adopted, and comparative tests of different practices are designed. Specific schemes and test results are shown in Table 2, and test parameters in the table indicate the steps performed (including a missing rate parameter).

TABLE 2

| No. | Experimental parameter | Mode | MSE | RMSE | MAE | Interpretation rate | Reconstruction rate |
|---|---|---|---|---|---|---|---|
| Test 1 | Eliminate data missing 100% DINEOF | 137 | 0.0219 | 0.1479 | 0.1059 | 95.21% | 74.86% |
| Test 2 | Eliminate data missing 95% DINEOF | 140 | 0.0212 | 0.1457 | 0.1044 | 95.01% | 58.24% |
| Test 3 | Abnormal image element detection Eliminate data missing 95% DINEOF | 144 | 0.0204 | 0.1427 | 0.1028 | 95.17% | 58.12% |
| Test 4 | Abnormal image element detection Eliminate data missing 95% Laplace smoothing filter DINEOF | 169 | 0.0184 | 0.1355 | 0.0977 | 96.82% | 58.12% |
| Test 5 | Abnormal image element detection Eliminate data missing 95% Laplace smoothing filter DINEOF Time mode quadratic decomposition interpolation | 169 | 0.0195 | 0.1395 | 0.0998 | 96.82% | 94.6% |

The parameters of Test 2 are consistent with those of the classic DINEOF, and the parameters of the Test 5 are consistent with those of the DINEOF-G proposed by the present disclosure. A sequence of the test parameters is consistent with a sequence of operating procedures in the test. From the specific test parameters and test results analysis, it can be seen that: when comparing the Test 2 and Test 3, the abnormal image element detection can improve the accuracy of reconstruction, and although some data is lost, it has less impact on the reconstruction rate, that is, the detection of abnormal image elements has a limited impact on the spatial and temporal missing rate of the original data. Comparing the Test 3 and Test 4, Laplace smoothing filter further improved the reconstruction accuracy, while significantly increasing the number of retained modes, and correspondingly increasing the signal interpretation rate. It reflects that the Laplace smoothing filter can better smooth the data fault caused by the night gap and the continuous lack of data, and it restores some of the characteristics of the original data. Comparing the Test 4 and Test 5, the Test 5, based on the reconstruction results of the Test 4, uses the time mode quadratic decomposition interpolation to reconstruct the data at times having the spatial missing rate larger than 95%. The reconstruction accuracy of the Test 5 is slightly lower than that of the Test 4, mainly due to introduction of additional sample observation values (data with a missing rate higher than 95% and lower than 100%), but it is still better than the Test 1 using the same sample, and this also reflects the accuracy of the time mode quadratic decomposition interpolation results is relatively high.

Figure 2:
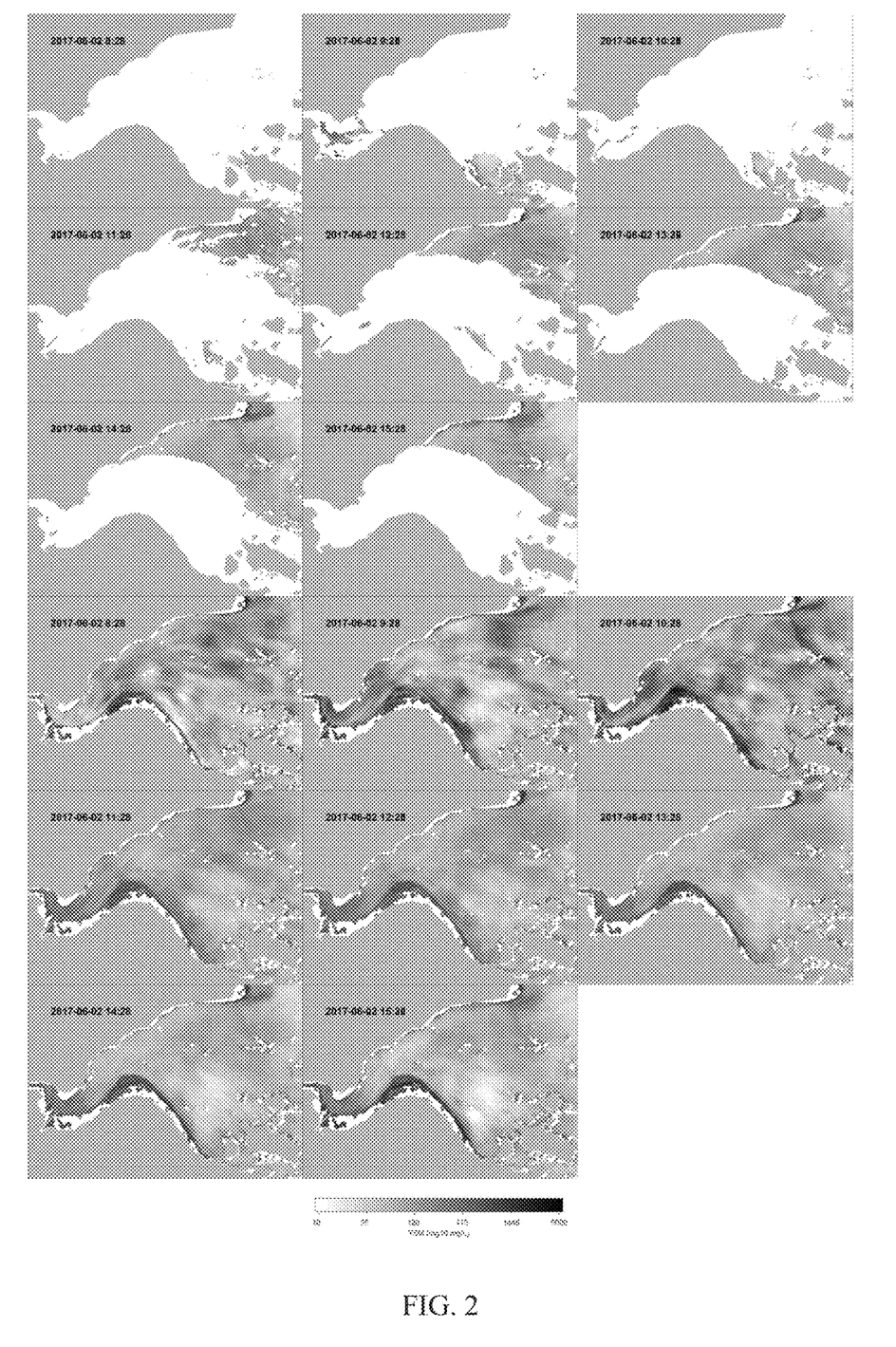
FIG. 2 shows comparison between original and reconstructed images of a GOCI total suspended matter concentration on Jun. 2, 2017.
Figure 3:
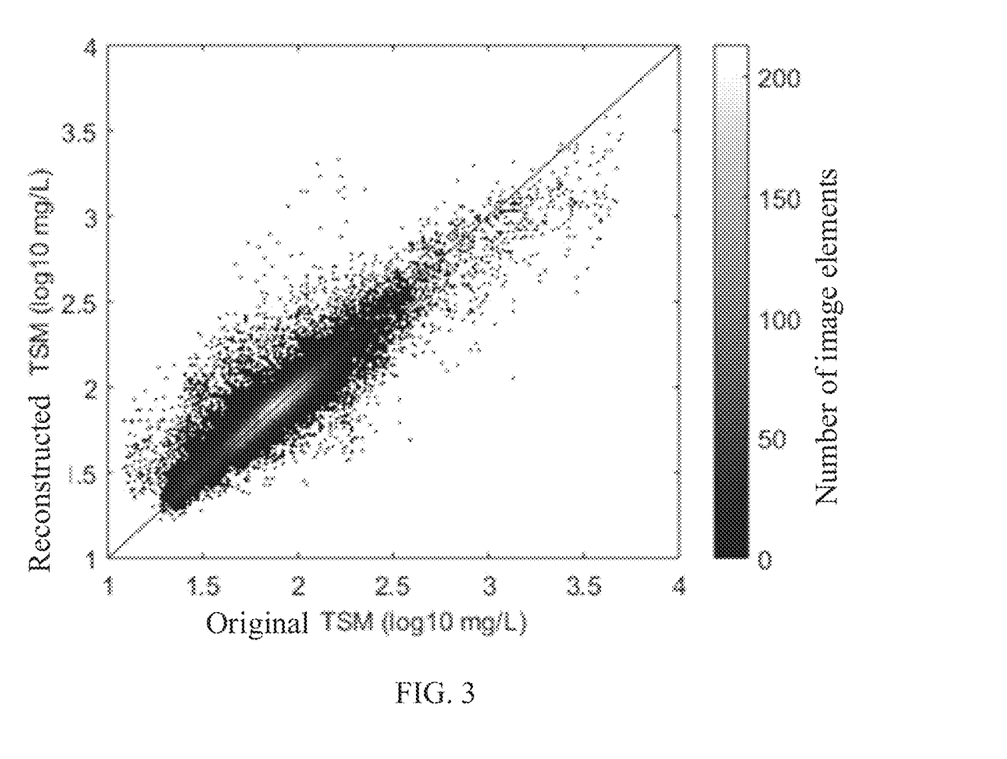
FIG. 3 shows reconstruction accuracy results of a GOCI total suspended matter concentration on Jun. 2, 2017.

In order to visually demonstrate the reconstruction effect, under the DINEOF-G reconstruction method of the present disclosure, the GOCI TSM data reconstruction results of Hangzhou Bay for 8 times a day for 365 days in 2017 are obtained. FIG. 2 illustrates the original data and the reconstructed data of the TSM on Jun. 2, 2017 (upper eight ones are original images, and lower eight ones are reconstructed images), and the overall missing rate of the eight original data on that day is 76.68%, of which the date missing rates at 8:30 and 10:30 exceed 95%. It can be seen that when using the time mode quadratic decomposition interpolation to reconstruct discontinuous missing data, although the temporal modes corresponding to the data at 9:30 is not used for interpolation, the data still has good continuity, and the dynamic characteristics are obvious, which is an effect that the classic DINEOF method cannot achieve using averages to reconstruct the data with high missing rates. For cloud trails that appear in the data at 15:30, the reconstructed data can also be better filtered. Accuracy evaluation is performed on values of the valued image elements in the original data and values of the reconstructed image elements in the same area of the reconstructed data, and evaluation results are as shown in FIG. 3, original values and reconstructed predicted values are concentrated around a y=x line, RSM is 0.0098, RMSE is 0.0989, and MAE is 0.0645, showing that respective accuracy indicators of the method of the present disclosure are relatively ideal, making it have very important practical application values for the reconstruction of the geostationary ocean color satellite data.

The above embodiment is only a preferred solution of the present disclosure, but it is not intended to limit the present disclosure. Those of ordinary skill in the related art can make various changes and modifications without departing from the spirit and scope of the present disclosure. Therefore, all technical solutions obtained by equivalent substitutions or equivalent transformations fall within the protection scope of the present disclosure.

What is claimed is:

1. A reconstruction method for geostationary ocean color satellite data based on Data INterpolating Empirical Orthogonal Functions, the reconstruction method comprising steps of:
   S1: performing preprocessing for each geostationary ocean color satellite remote sensing image in an original ocean color remote sensing data set to be reconstructed, and setting abnormal image elements as data missing points, and eliminating, from the data set, extremely-high-missing-rate data having a missing rate higher than an upper limit in time or space;
   S2: constructing a two-dimensional data matrix based on a time-space field of preprocessed ocean color remote sensing data set, performing reconstruction by the Data INterpolating Empirical Orthogonal Functions, and, before each iteration decomposition, filtering a time covariance matrix using Laplace smoothing filter; and after the reconstruction, obtaining an optimal retained mode number, and a corresponding temporal modes and spatial modes;
   S3: decomposing the temporal modes into characteristic mode vectors according to columns, each column of the characteristic mode vectors is decomposed into a plurality of sub-temporal mode according to time to which data comprised in the preprocessed ocean color remote sensing data set belongs, then performing empirical modal decomposition on each of the plurality of sub-temporal mode, using a cubic spline interpolation method to complement data at positions corresponding to the extremely-high-missing-rate data in inherent mode function components and residual after decomposition, and re-superimposing and merging to obtain a complete temporal modes having a continuous time series; and
   S4: using the spatial modes obtained in the step S2 and the complete temporal modes obtained in the step S3, to reconstruct to obtain a geostationary ocean color satellite data set with full coverage in time and space.

2. The reconstruction method according to claim 1, wherein in the step S1, for each geostationary ocean color satellite remote sensing image, the abnormal image elements are identified and processed according to steps of S11 to S15:
   S11: for each geostationary ocean color satellite remote sensing image in an original ocean color remote sensing data set to be reconstructed, setting a space window having a side length of L by respectively taking each valued image element in the image as a center;
   S12: for each valued image element, calculating concentration $O_{conc}$ of the image element by taking all valued image elements in the space window corresponding to the image element as a sample data set O:

$$O_{conc} = \left| \frac{O_i - O_m}{\delta} \right|$$

where $O_i$ is a current image element value of the concentration to be calculated, $O_m$ is a median of the sample data set O, and a standard deviation $\delta$ is $\delta=k*MAD(O)$, where k is a scale factor constant, and MAD(O) is a median absolute deviation of the sample data set O;
   S13: for each valued image element respectively, calculating an edge detection value $O_{prox}$ of the image element, and $O_{prox}$ being a positive value if a valueless image element exists around the image element, or $O_{prox}$ being zero if no valueless image element exists around the image element, then $O_{prox}$ will take zero;
   S14: for each valued image element respectively, calculating an anomaly detection result $O_{final}$ of the image element:

$$O_{final} = w_{prox} O_{prox} + w_{conc} O_{conc}$$

where $w_{prox}$ is an edge detection weight, $w_{conc}$ is a concentration detection weight, and it is satisfied that $w_{prox} + w_{conc} = 1$; and
   S15: according to a preset threshold $O_{threshold}$ of abnormal image element detection, taking the image element having the $O_{final}$ larger than the threshold $O_{threshold}$ as the abnormal image element, and setting the abnormal image element as the data missing point.

3. The reconstruction method according to claim 1, wherein in the step S1, eliminating the extremely-high-missing-rate data comprises:
   in terms of time, if a missing rate of the geostationary ocean color satellite remote sensing image at a certain moment is larger than an upper limit of the missing rate, eliminating an image corresponding to the moment; and in terms of space, if a missing rate of time series data at a certain position point in all geostationary ocean color satellite remote sensing images is larger than the upper limit of the missing rate, eliminating the image element values of the position point in all images.

4. The reconstruction method according to claim 3, wherein the upper limit of the missing rate is 95%.

5. The reconstruction method according to claim 1, wherein the step S2 comprises steps of:
   S21: setting the time-space field of the preprocessed ocean color remote sensing data set as an m×n two-dimensional data matrix $X^0$, where m is the number of spatial position points in the geostationary ocean color satellite remote sensing image, n is the total number of moments represented by the image in the ocean color remote sensing data set, and m>n, wherein for the matrix $X^0$, the m rows respectively represent the time series values of m different spatial position points, and the n columns respectively represent the values of all the spatial position points at n different moments;
   S22: calculating an average $\overline{X^0}$ of all valid data in the matrix $X^0$, and letting $X=X^0-\overline{X^0}$; and randomly selecting a part of the valid data from the matrix X as a cross-validation set $X^c$, and setting values of all the missing points of the data in the matrix X and the elements extracted into the cross-validation set $X^c$ to be zero;
   S23: iterating on the number P of the retained modes, calculating the spatial modes $U_P$, the temporal modes $V_P$, and a root mean square error R between the reconstructed value and the original value of the cross-validation set under different P values; wherein steps S231 to S234 are executed in each iteration:
   S231: performing a singular value decomposition on the matrix X, calculating P largest singular values and singular vectors through eigenvector decomposition, then obtaining an m×P spatial modes $U_P$, P×P singular value matrix $S_P$, and n×P temporal modes $V_P$, and a calculation equation thereof is:

$$X^T X v_i = \rho_i^2 v_i$$

$$u_i = \frac{X v_i}{\rho_i}$$

where $u_i$ is an i-th column of the spatial modes $U_P$, $v_i$ is an i-th column of the temporal modes $V_P$, $\rho_i$ is a singular value corresponding to $u_i$ and $v_i$, i=1, ..., P; and $X^T X$ is an n×n time covariance matrix;

S232: using the Laplace smoothing filter to first filter columns of the time covariance matrix, and then filter rows of the time covariance matrix; wherein for the rows or columns of the time covariance matrix, each is regarded as a time series data set C={$c_1, c_2, \ldots, c_n$} comprising data of n moments, and a time set corresponding to C is T={$t_1, t_1, \ldots, t_n$}, $c_l$ is time series data of a l-th time $t_l$, l=1, 2, ..., n, and it is satisfied that $t_1 < t_2 < \ldots < t_n$; and a formula for the Laplace smoothing filter is:

$$c_l^{(s+1)} = c_l^{(s)} + \frac{w_{l+1} - w_l}{t'_{l+1} - t'_l}$$

$$w_l = \alpha \frac{c_l - c_{l-1}}{t_l - t_{l-1}}$$

$$t'_l = t_{l-1} + t_l$$

where $c_l^{(s)}$ represents data $c_l$ before the Laplace smoothing filter, $c_l^{(s+1)}$ represents data $c_l$ after the Laplace smoothing filter, and $\alpha$ is a smoothing strength, $0 < \alpha < 1$;

S233: after completing the Laplace smoothing filter once, calculating reconstructed values of all data missing points in the matrix X, wherein a reconstructed value $X_{i,j}^{re}$ of a missing point located in the i-th row and j-th column of the matrix X is:

$$X_{i,j}^{re} = \left(U_P S_P V_P^T\right)_{i,j} = \sum_{p=1}^{P} \rho_p (u_p)_i \left(v_p^T\right)_j$$

where $(u_p)_i$ is an i-th element in a p-th column of the spatial modes $U_P$, $(v_p^T)_j$ is a j-th element in a p-th column of the temporal modes $V_P$, and $\rho_p$ is a corresponding singular value; and S234: calculating a root mean square error R between the reconstructed value and the true value of all the elements in the cross-validation set:

$$R = \sqrt{\frac{1}{N} \sum_{p=1}^{N} \left(X_p^{re} - X_p^c\right)^2}$$

where N is the total number of data in the cross-validation set; $X_p^{re}$ and $X_p^c$ are the reconstructed value and true value of the p-th element in the cross-validation set, respectively;

wherein if the root mean square error R is larger than an error threshold, the reconstructed values of all missing points in the matrix X obtained in the step S233 are updated to the matrix X, then the steps S231 to S233 are repeated for the updated matrix X, until the root mean square error R converges below the threshold, then the repetition stops, and the converged root mean square error R is recorded as the root mean square error $R^P$ under the current retained mode number P; and S24: comparing the root mean square error $R^P$ under different retained mode numbers P=1, 2, ..., $k_{MAX}$, taking the P value corresponding to the smallest $R^P$ as an optimal retained mode number $\overline{P}$, to obtain an optimal temporal modes $V_{\overline{P}}$ and an optimal spatial modes $U_{\overline{P}}$.

6. The reconstruction method according to claim 5, wherein in the step S23, an iteration range of the retained mode number P is [1,$k_{Max}$], and the maximum number of iterations $k_{MAX} \leq \min(m,n)$.

7. The reconstruction method according to claim 5, wherein in the step S23, if a number of repetitions of the steps S231 to S233 for the singular value decomposition and the Laplace smoothing filter reaches a maximum number of times, the repetition stops, and a final root mean square error R is directly recorded as the root mean square error $R^P$ under the current retained mode number P.

8. The reconstruction method according to claim 1, wherein the step S3 comprises steps of:

S31: decomposing each column of characteristic mode vectors in the optimal temporal modes $V_{\overline{P}}$, and when decomposing, decomposing data belonging to same time in different days into one sub-temporal modes with a daily cycle, and the i-th column characteristic mode vector $v_i(t)$ is decomposed into:

$$v_i(t) = \{v_{i1}(d1), v_{i2}(dk), \ldots, v_{iK}(dK)\}$$

where K is the total number of daily data frequencies of the geostationary ocean color satellite remote sensing image; $v_{ik}(dk)$ is the sub-temporal modes corresponding to the k-th time in $v_i(t)$, and comprises data of the k-th time of all dates in $v_i(t)$; i=1, 2, ..., $\overline{P}$; k=1, 2, ..., K; dk represents dates comprised in the data of the k-th time of all dates in $v_i(t)$, and a missing date corresponding to the extremely-high-missing-rate data is not comprised in dk;

S32: performing empirical decomposition for each sub-temporal modes $v_{ik}(dk)$ in each column of the characteristic mode vectors:

$$v_{ik} = (dk) = \sum_{j=1}^{n} c_j(dk) + r_n(dk)$$

where n is the total number of moments represented by the images in the ocean color remote sensing data set, and $c_j(dk)$ is the j-th inherent mode function component, and $r_n(dk)$ is residual of the decomposition;

S33: for each sub-temporal modes $v_{ik}(dk)$, using a cubic spline interpolation method to interpolate and fill all the inherent mode function components $c_j(dk)$ and the data missing date positions in the residual signal $r_n(dk)$, then re-superimposing all the inherent mode function components and residual signals after the interpolation and filling, to obtain the sub-temporal modes $v_{ik}(Dk)$ having a complete time series, wherein Dk comprises all consecutive dates having the k-th time;

S34: re-superimposing and merging the K sub-temporal mode $v_{ik}(Dk)$ of a same column of the characteristic mode vectors, to obtain the complete characteristic mode vector $v_i(T)$ comprising all moments; and S35: re-superimposing and merging all $\overline{P}$ columns of the complete characteristic mode vectors $v_i(T)$, to obtain the complete temporal modes $V_T$ having a continuous time series.

9. The reconstruction method according to claim 8, wherein the total number K of the daily data frequencies of the geostationary ocean color satellite remote sensing image is 8.

10. The reconstruction method according to claim 1, wherein the step S4 comprises steps of:

S41: using the spatial modes $U_{\overline{P}}$ obtained in the step S2 and the complete temporal modes $V_T$ obtained in the step S3, to recalculate the reconstructed values of all missing points in the matrix X, and the reconstructed value $X_{i,j}^{re}$ of the missing point located in the i-th row and j-th column of the matrix X is:

$$X_{i,j}^{re} = \left(U_{\overline{P}} S_{\overline{P}} V_T^T\right)_{i,j} = \sum_{p=1}^{\overline{P}} \overline{\rho}_p (\overline{u}_p)_i (\overline{v}_p^T)_j$$

where $(\overline{u}_p)_i$ is the i-th element in the p-th column of the spatial modes $U_{\overline{P}}$, $(\overline{v}_p^T)_j$ is the j-th element in the p-th column of the temporal modes $V_T$, $\overline{\rho}_p$ is a corresponding singular value; and S42: updating the reconstructed values of all missing points in the matrix X obtained in the step S41 to the matrix X, and keeping values of other elements of the matrix X unchanged, to obtain the time-space field of the ocean color remote sensing data set with the missing values being complemented, so as to obtain a geostationary ocean color satellite data set fully covering time and space.

* * * * *